(12) United States Patent
Lin et al.

(10) Patent No.: US 11,669,339 B2
(45) Date of Patent: Jun. 6, 2023

(54) HARDWARE SETTING DEVICE AND HARDWARE SETTING METHOD THEREOF

(71) Applicant: REALTEK SEMICONDUCTOR CORPORATION, Hsinchu (TW)

(72) Inventors: Chun Hao Lin, Hsinchu (TW); Tsunghan Tsai, Hsinchu (TW); Zhen-Ting Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 304 days.

(21) Appl. No.: 17/123,050

(22) Filed: Dec. 15, 2020

(65) Prior Publication Data
US 2021/0191738 A1 Jun. 24, 2021

(30) Foreign Application Priority Data

Dec. 24, 2019 (TW) ................................. 108147370

(51) Int. Cl.
*G06F 9/44* (2018.01)
*G06F 9/445* (2018.01)
*G06F 9/54* (2006.01)
*G06F 9/4401* (2018.01)

(52) U.S. Cl.
CPC ........ *G06F 9/44505* (2013.01); *G06F 9/4406* (2013.01); *G06F 9/4411* (2013.01); *G06F 9/542* (2013.01)

(58) Field of Classification Search
CPC ................................... G06F 1/32; G06F 9/44
See application file for complete search history.

(56) References Cited

U.S. PATENT DOCUMENTS

| | | | | |
|---|---|---|---|---|
| 2003/0065853 | A1* | 4/2003 | Lary | G06F 9/4812 710/260 |
| 2008/0072026 | A1* | 3/2008 | Allison | G06F 9/4418 713/1 |
| 2015/0143362 | A1* | 5/2015 | Lukacs | G06F 9/4843 718/1 |
| 2019/0056959 | A1* | 2/2019 | Piwonka | G06F 9/4411 |

FOREIGN PATENT DOCUMENTS

TW          I5094138          11/2015

* cited by examiner

*Primary Examiner* — Keshab R Pandey
(74) *Attorney, Agent, or Firm* — WPAT, P.C. Intellectual Property Attorneys; Anthony King

(57) ABSTRACT

The present invention provides a hardware setting device and hardware setting method thereof. The hardware setting device is configured to: boot an operating system; retrieve at least one hardware setting corresponding to a peripheral device from a pre-boot memory; and configure the peripheral device according to the at least one hardware setting.

20 Claims, 5 Drawing Sheets

HARDWARE SETTING DEVICE AND HARDWARE SETTING METHOD THEREOF

CROSS REFERENCE TO RELATED APPLICATIONS

This application claims priority of Taiwan application No. 108147370 filed on Dec. 24, 2019, which is incorporated by reference in its entirety.

BACKGROUND

Field of the Invention

The present invention relates generally to a hardware setting device and a hardware setting method thereof, more particularly, to a hardware setting device and a hardware setting method thereof for automatically pre-configuring hardware.

Description of Related Art

Conventionally, a computing device can connect with and control multiple peripheral devices. Specifically, after booting the computing device, an operating system (e.g., Windows Operating System) is first executed, and the user can only execute device management software (e.g., the Device Manager of the Windows Operating System) until the operating system finishes the setting of the operating environment, so that the user can individually change the settings of different peripheral devices as necessary.

BRIEF SUMMARY OF THE INVENTION

Some embodiments of the present invention provide a hardware setting method, including: retrieving at least one hardware setting associated with a peripheral device from a pre-boot memory after booting an operating system; and setting the peripheral device according to the at least one hardware setting.

Some embodiments of the present invention provide a hardware setting device, including: a processing unit, a pre-boot memory and a system memory. The pre-boot memory is configured to store at least one hardware setting associated with a peripheral device. The system memory is configured to store a program that, when being executed, causes the processing unit to: retrieve the at least one hardware setting associated with the peripheral device from the pre-boot memory after booting an operating system; and set the peripheral device according to the at least one hardware setting.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the invention.

Figure 1A:
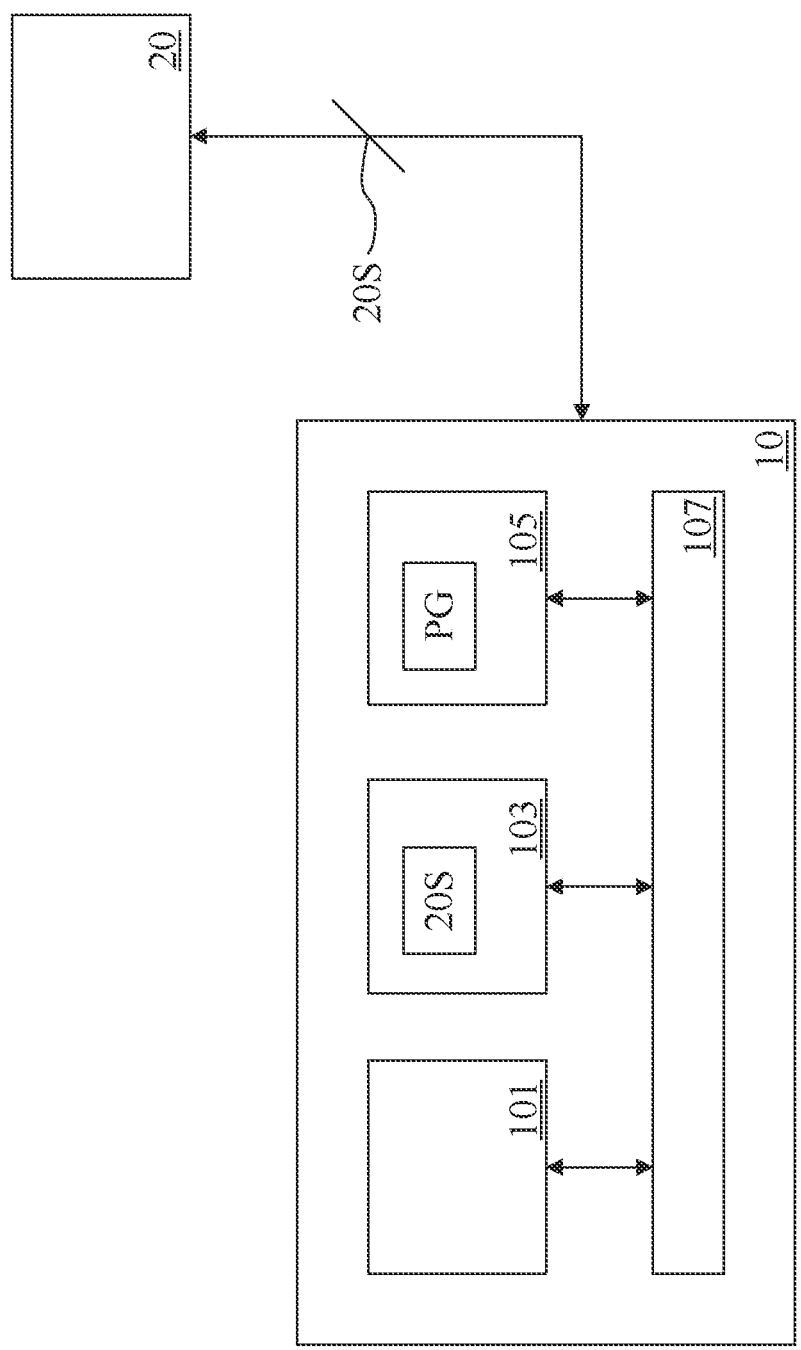
FIG. 1A is a block diagram illustrating a hardware setting device according to some embodiments of the present invention.

To automatically load settings associated with peripheral devices after booting the operating system of the devices so as to expedite the using procedure of peripheral devices, the present invention provides a hardware setting device 10. Please refer to FIG. 1A, which is a block diagram illustrating the hardware setting device 10 of some embodiments of the present invention. The hardware setting device 10 includes a processing unit 101, a pre-boot memory 103 and a system memory 105.

In some embodiments, the pre-boot memory 103 and the system memory 105 belong to different memory blocks of the same memory hardware. In some embodiments, the pre-boot memory 103 and the system memory 105 are different pieces of memory hardware. In these embodiments, the pre-boot memory 103 can be allocated to Basic Input/Output System (BIOS), Unified Extensible Firmware Interface (UEFI) or Preboot eXecution Environment (PXE) interface.

Specifically, the hardware setting device 10 is electrically connected with a peripheral device 20 through a connection interface (e.g., I/O interface), and the pre-boot memory 103 stores at least one hardware setting 20S associated with the peripheral device 20. The system memory 105 stores a program PG. The processing unit 101, the pre-boot memory 103 and the system memory 105 are electrically connected via a bus 107. When the power of the hardware setting device 10 is turned on, the boot program (e.g., BIOS and boot loader) is executed and the operating system is bootstrapped, the processing unit 101 can execute the program PG stored by the system memory 105 via the bus 107 which can trigger the processing unit 101 to execute the hardware setting function of the peripheral devices.

In detail, after the execution of the program PG the processing unit 101 retrieves at least one hardware setting 20S associated with the peripheral device 20 from the pre-boot memory 103, and sets the peripheral device 20 according to the at least one hardware setting 20S. More specifically, after booting the operating system, the execution of the program PG is automatically triggered, and the execution of the program PG causes the processing unit 101 to retrieve the at least one hardware setting 20S associated with the peripheral device 20 from the pre-boot memory 103 and set the peripheral device 20 according to the at least one hardware setting 20S. Therefore, the related configurations of the peripheral device 20 can be set based on the at least one hardware setting 20S stored in the pre-boot memory 103, while it is not necessary to wait for the operating system to set the operating environment, and the user does not have to execute additional device managing software under the operating system.

In some embodiments, the at least one hardware setting 20S can be configured to set up various functions of the peripheral device 20. For example, the at least one hardware setting 20S can be configured to turn on or off the indication lamp, enable/disable the power-saving function, internet wake-up function or the like of the peripheral device 20.

The operation details are discussed further below. Specifically, after the execution of the program PG the processing unit 101 is caused to send a first system call (not shown) to the operating system. Subsequently, the operating system retrieves at least one hardware setting 20S associated with the peripheral device 20 from pre-boot memory 103 according to first system call, and makes a response to the first system call after retrieving the at least one hardware setting 20S. Next, the processing unit 101 can obtain at least one hardware setting 20S associated with the peripheral device 20 stored in the pre-boot memory 103 according to the response to the first system call. In some embodiments, the first system call is further configured to notify the operating system of writing the at least one hardware setting 20S into the system memory 105 for later use. Therefore, during the subsequent operations, the processing unit 101 can retrieve and utilize the at least one hardware setting 20S from the system memory 105.

Figure 1B:
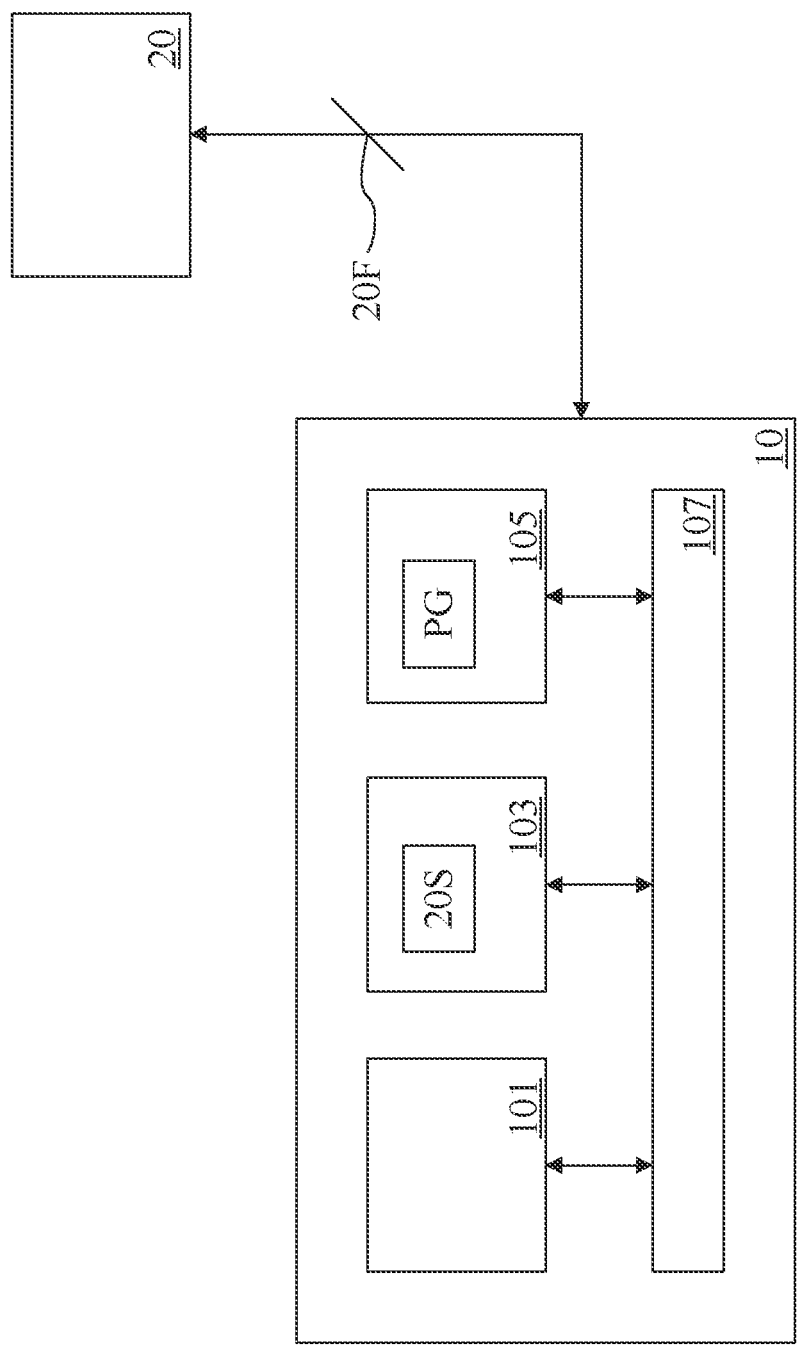
FIG. 1B is a block diagram illustrating a hardware setting device according to some embodiments of the present invention.

Next, after obtaining the at least one hardware setting 20S, the processing unit 101 executes a driver (not shown) associated with the peripheral device 20, ant sets up the peripheral device 20 based on the at least one hardware setting 20S by executing the driver. Please refer to FIG. 1B together. In some embodiments, after the related configurations of the peripheral device 20 are set based on the at least one hardware setting 20S, the peripheral device 20 can change the settings during the operation process and generate a setting feedback message 20F based on the content of the changed setting. Subsequently, the peripheral device 20 returns the setting feedback message 20F to the hardware setting device 10 via the connection interface with the hardware setting device 10. The setting feedback message 20F is configured to notify the hardware setting device 10 of that the setting of the peripheral device 20 has changed.

Accordingly, after the processing unit 101 receives the setting feedback message 20F, the processing unit 101 determines an update hardware setting (not shown) based on the setting feedback message 20F. The update hardware setting includes the changed setting of the peripheral device 20. Next, the processing unit 101 updates the at least one hardware setting 20S associated with the peripheral device 20 stored in the pre-boot memory 103 according to update hardware setting. More specifically, the processing unit 101 sends a second system call to the operating system based on the update hardware setting, so as to notify the operating system of updating the at least one hardware setting 20S associated with the peripheral device 20 stored in the pre-boot memory 103 according to update hardware setting.

Therefore, when the hardware setting device 10 is restarted and the peripheral device 20 is set by the hardware setting device 10, since the at least one hardware setting 20S stored in the pre-boot memory 103 is the updated setting, the subsequent settings for the peripheral device 20 using the at least one hardware setting 20S cause the peripheral device 20 to operate based on the updated hardware setting.

In some embodiments, the user can change the at least one hardware setting 20S stored in the pre-boot memory 103. Specifically, the user may use a human interface device (HID) (not shown) to input a hardware setting change instruction (not shown) into the hardware setting device 10. During the execution of the program PG, the processing unit 101 is caused to receive the hardware setting change instruction. Subsequently, the processing unit 101 can update the at least one hardware setting 20S stored in the pre-boot memory 103 according to hardware setting change instruction.

In some embodiments, the foregoing steps can operate when the operating system is running. In detail, the processing unit 101 can send a third system call to the operating system according to the hardware setting change instruction, so as to notify the operating system to update the at least one hardware setting 20S associated with the peripheral device 20 stored in the pre-boot memory 103. Therefore, the at least one hardware setting 20S stored in the pre-boot memory 103 can be adjusted as needed.

Figure 2:
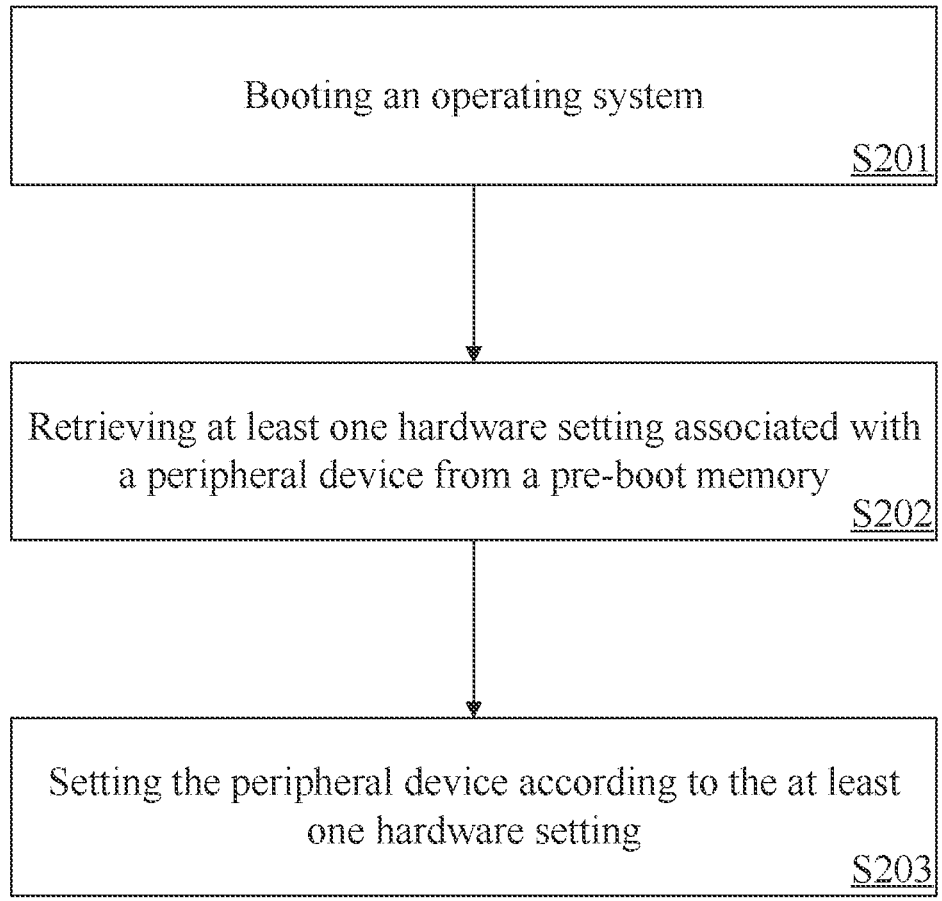
FIG. 2 is a flowchart diagram of a hardware setting method according to some embodiments of the present invention.

Some embodiments of the present invention provide hardware setting methods, and a flowchart thereof is shown in FIG. 2. The hardware setting methods of these embodiments are implemented by a hardware setting device (such as the hardware setting device 10 according to the above-mentioned embodiments). Detailed operations of said methods are discussed hereinbelow.

First, step S201 is executed to boot an operating system. Next, step S202 is executed to retrieve at least one hardware setting associated with a peripheral device from a pre-boot memory after booting the operating system. Then, step S203 is executed to set the peripheral device according to the at least one hardware setting.

Figure 3A:
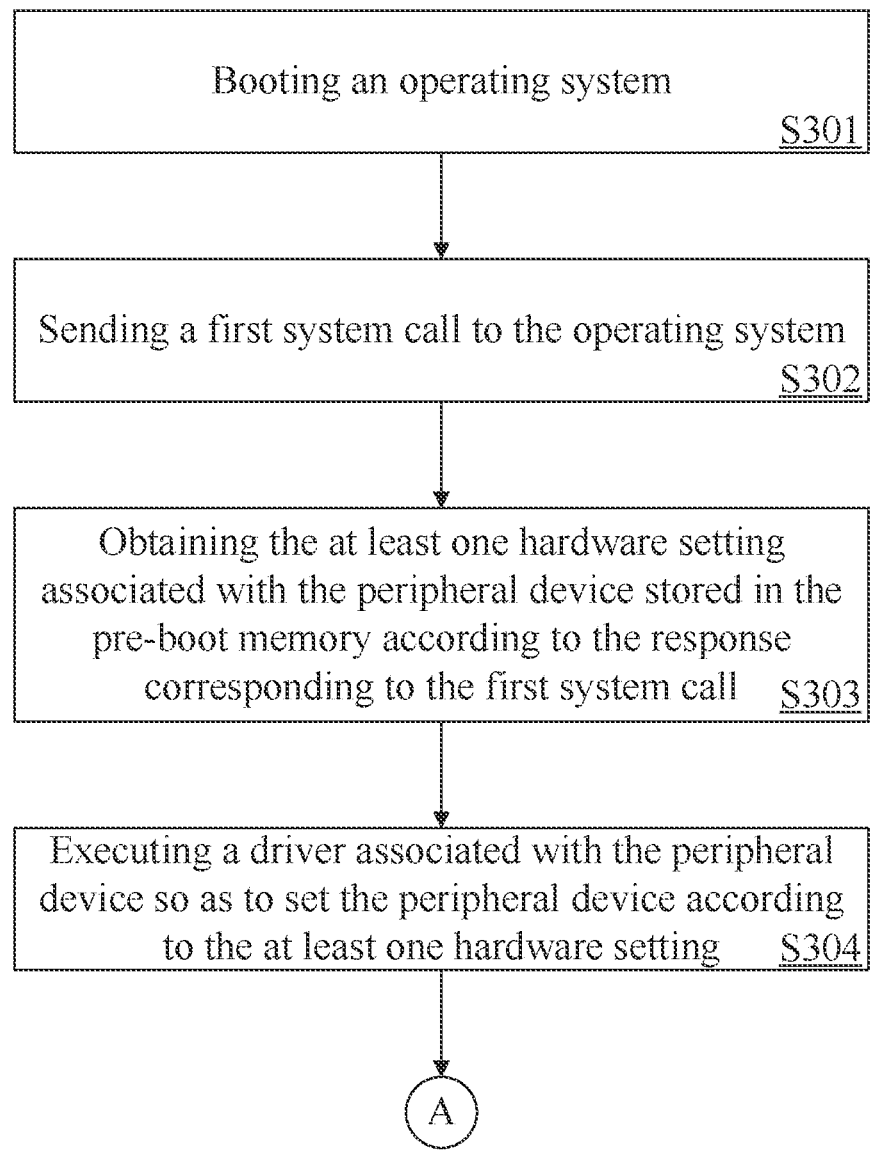
FIGS. 3A to 3C are flowchart diagrams of a hardware setting method according to some embodiments of the present invention.
Figure 3B:
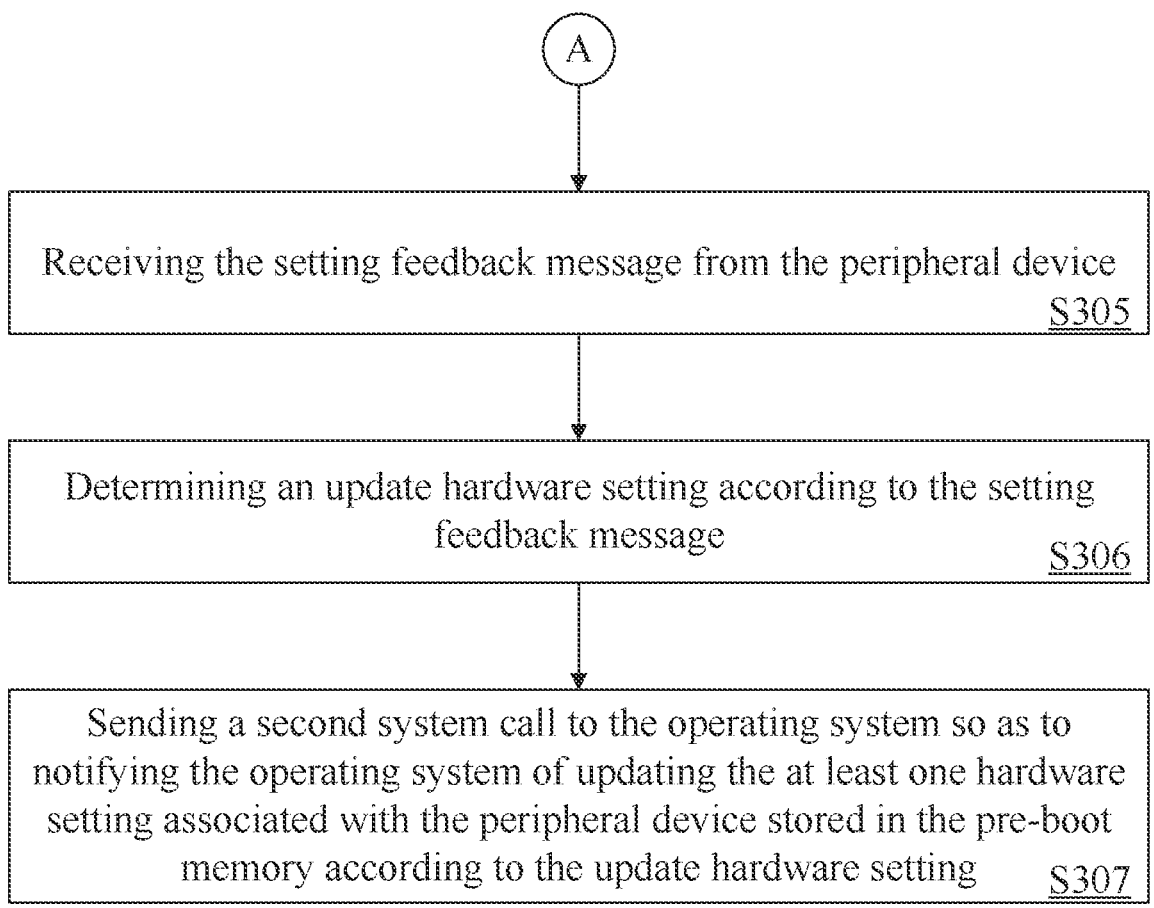

Some embodiments of the present invention provide hardware setting methods, and a flowchart thereof is shown in FIGS. 3A and 3B. The hardware setting methods of these embodiments are implemented by a hardware setting device (such as the hardware setting device 10 according to the above-mentioned embodiments). Detailed operations of said methods are discussed hereinbelow.

First, step S301 is executed to boot an operating system. Next, step S302 is executed to send a first system call to the operating system. The operating system retrieves at least one hardware setting associated with a peripheral device from a pre-boot memory according to first system call, and makes a response to the first system call after retrieving the at least one hardware setting. Then step S303 is executed to obtain the at least one hardware setting associated with the peripheral device stored in the pre-boot memory according to the response corresponding to the first system call.

In some embodiments, the first system call is further configured to notify the operating system of writing the at least one hardware setting into a system memory for later use. In step S303, the at least one hardware setting can be retrieved from the system memory and utilized. Next, S304 is executed to execute a driver associated with the peripheral device, so as to set the peripheral device according to the at least one hardware setting.

After the related configurations of the peripheral device are set based on the at least one hardware setting, the peripheral device changes the setting during the operation process and generate a setting feedback message based on the changed setting. Step S305 is executed to receive the setting feedback message from the peripheral device. Step S306 is executed to determine an update hardware setting according to the setting feedback message. Step S307 is executed to send a second system call to the operating system, so as to notify the operating system of updating the at least one hardware setting associated with the peripheral device stored in the pre-boot memory according to the update hardware setting.

Figure 3C:
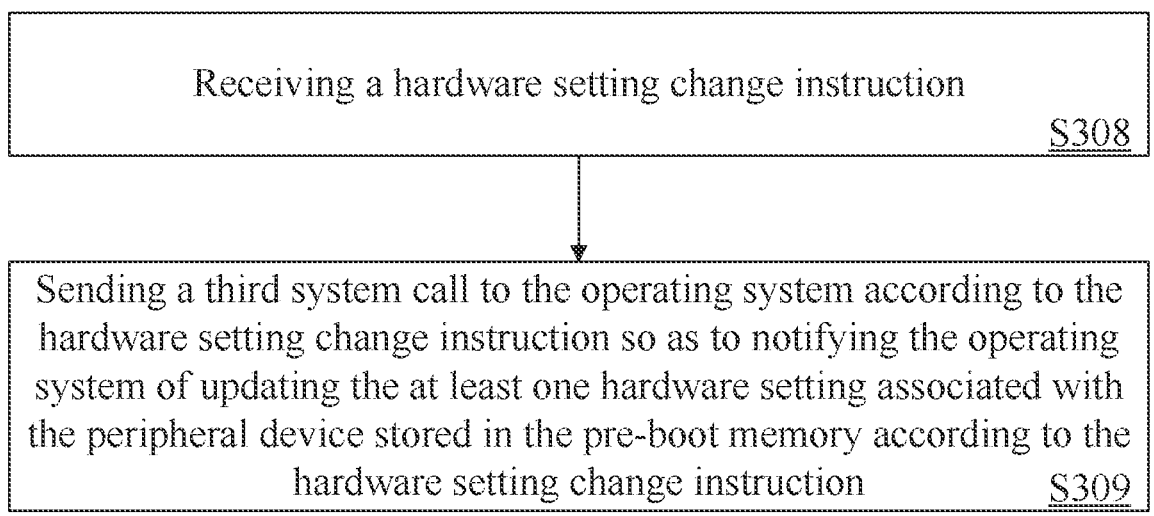

Please refer to FIG. 3C, in some embodiments, the step S308 and step S309 can be optionally executed after the operating system has been bootstrapped, and are configured to directly adjust the content in the pre-boot memory. In detail, step S308 is executed to receive a hardware setting change instruction. Step S309 is executed to send a third system call to the operating system according to the hardware setting change instruction, so as to notify the operating system of updating the at least one hardware setting associated with the peripheral device stored in the pre-boot memory based on the hardware setting change instruction.

It should be noted that in some embodiments, in the above mentioned hardware setting device, the processing unit includes logic circuit cache ways such as central processing units (CPUs) capable of carrying out computation and instructions, and the pre-boot memory and the system memory include a non-volatile memory; however, this is not a limitation to the embodiments of the implementations of the hardware components of the present invention.

This invention described above may be implemented as appropriate hardware component, software component, and/or combination of hardware components and software components. At least part of this invention can be optionally implemented as software which is running on one or more data processors, digital signal processors or configurable module elements (e.g., Field Programmable Gate Arrays).

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A hardware setting method, comprising:
   retrieving at least one hardware setting associated with a peripheral device from a pre-boot memory after booting an operating system; and
   setting the peripheral device according to the at least one hardware setting without waiting for the operating system to set an operating environment.

2. The hardware setting method of claim 1, wherein retrieving the at least one hardware setting from the pre-boot memory further comprises:
   sending a system call to the operating system; and
   obtaining the at least one hardware setting associated with the peripheral device stored in the pre-boot memory according to a response corresponding to the system call.

3. The hardware setting method of claim 2, wherein the system call is further configured to notify the operating system of writing the at least one hardware setting into a system memory.

4. The hardware setting method of claim 1, wherein setting the peripheral device according to the at least one hardware setting further comprises:
   executing a driver associated with the peripheral device, so as to set the peripheral device according to the at least one hardware setting.

5. The hardware setting method of claim 1, further comprising:
   receiving a setting feedback message from the peripheral device.

6. The hardware setting method of claim 5, further comprising:
   determining an update hardware setting according to the setting feedback message; and
   updating the at least one hardware setting associated with the peripheral device stored in the pre-boot memory according to the update hardware setting.

7. The hardware setting method of claim 6, wherein updating the at least one hardware setting stored in the pre-boot memory further comprises:
   sending a system call to the operating system, so as to notify the operating system of updating the at least one hardware setting associated with the peripheral device stored in the pre-boot memory according to the update hardware setting.

8. The hardware setting method of claim 1, further comprising:
   receiving a hardware setting change instruction; and
   updating the at least one hardware setting associated with the peripheral device stored in the pre-boot memory according to the hardware setting change instruction.

9. The hardware setting method of claim 8, wherein updating the at least one hardware setting stored in the pre-boot memory further comprises:
   sending a system call to the operating system, so as to notify the operating system of updating the at least one hardware setting associated with the peripheral device stored in the pre-boot memory.

10. The hardware setting method of claim 1, wherein the pre-boot memory includes a non-volatile memory.

11. A hardware setting device, comprising:
    a processing unit;
    a pre-boot memory, being configured to store at least one hardware setting associated with a peripheral device;
    a system memory, being configured to store a program that, when being executed, causes the processing unit to:
       retrieve the at least one hardware setting associated with the peripheral device from the pre-boot memory after booting an operating system; and
       set the peripheral device according to the at least one hardware setting without waiting for the operating system to set an operating environment.

12. The hardware setting device of claim 11, wherein retrieving the at least one hardware setting from the pre-boot memory further comprises:
    sending a system call to the operating system; and
    obtaining the at least one hardware setting associated with the peripheral device stored in the pre-boot memory according to a response corresponding to the system call.

13. The hardware setting device of claim 12, wherein the system call is further configured to notify the operating system of writing the at least one hardware setting into a system memory.

14. The hardware setting device of claim 11, wherein setting the peripheral device according to the at least one hardware setting further comprises:
    executing a driver associated with the peripheral device, so as to set the peripheral device according to the at least one hardware setting.

15. The hardware setting device of claim 11, wherein the program, when being executed, further causes the processing unit to:
    receive a setting feedback message from the peripheral device.

16. The hardware setting device of claim 15, wherein the program, when being executed, further causes the processing unit to:
   determine an update hardware setting according to the setting feedback message; and
   update the at least one hardware setting associated with the peripheral device stored in the pre-boot memory according to the update hardware setting.

17. The hardware setting device of claim 16, wherein updating the at least one hardware setting stored in the pre-boot memory further comprises:
   sending a system call to the operating system, so as to notify the operating system of updating the at least one hardware setting associated with the peripheral device stored in the pre-boot memory according to the update hardware setting.

18. The hardware setting device of claim 11, wherein the program, when being executed, further causes the processing unit to:
   receive a hardware setting change instruction; and
   update the at least one hardware setting associated with the peripheral device stored in the pre-boot memory according to the hardware setting change instruction.

19. The hardware setting device of claim 18, wherein updating the at least one hardware setting stored in the pre-boot memory further comprises:
   sending a system call to the operating system, so as to notify the operating system of updating the at least one hardware setting associated with the peripheral device stored in the pre-boot memory.

20. The hardware setting device of claim 11, wherein the pre-boot memory includes a non-volatile memory.

* * * * *